UNITED STATES PATENT OFFICE.

GEORGE K. OSBORN, OF BROOKLYN, NEW YORK, ASSIGNOR TO GEORGE W. THOMPSON, OF SAME PLACE.

IMPROVEMENT IN LAMP-WICKS.

Specification forming part of Letters Patent No. 183,815, dated October 31, 1876; application filed June 16, 1876.

*To all whom it may concern:*

Be it known that I, GEO. K. OSBORN, of Brooklyn, in the county of Kings and State of New York, have invented a new and useful Improvement in Lamp-Wicks, which improvement is fully set forth in the following specifications:

The object of my invention is to make a permanent wick, which is easily made and has a high degree of porosity.

The nature of my invention consists in cementing pulverized charcoal together and forming it into the desired shape for wicks.

I use charcoal alone or with other substances, and I use one or more substances as a cement, and I do not confine myself to any definite amounts relatively, or to any particular substance as a cement, but the materials and proportions I find best adapted is of powdered charcoal, two parts; wheat flour, one part, and chalk, one part, with water enough to make into any desired consistency of paste for molding into the required forms.

I claim as my invention—

A lamp-wick, composed partly or wholly of powdered charcoal when cemented together, substantially as and for the purposes set forth.

GEO. K. OSBORN.

Witnesses:
   C. MCCAULEY,
   GEO. W. THOMPSON.